(No Model.)
P. T. BRADLEY.
HORSE COLLAR FASTENER.
No. 431,548. Patented July 8, 1890.
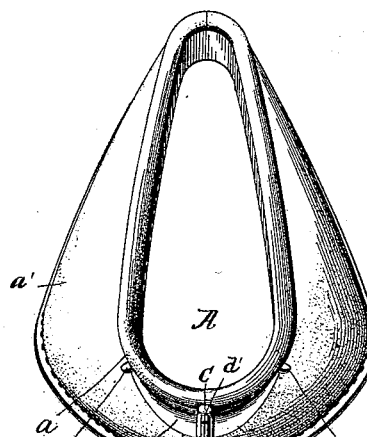
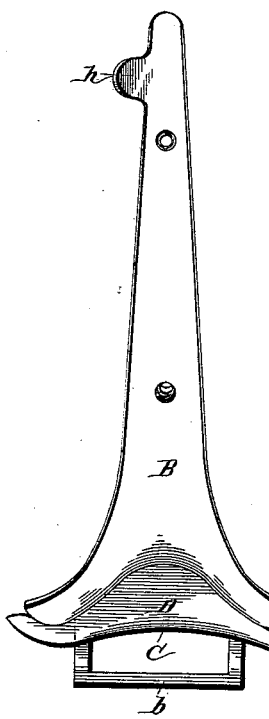
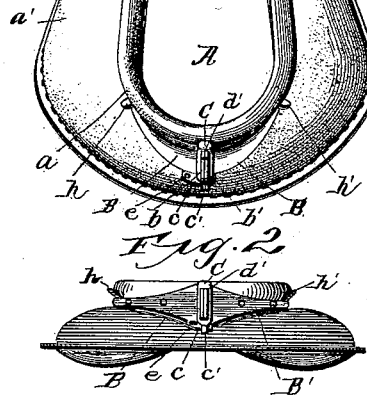
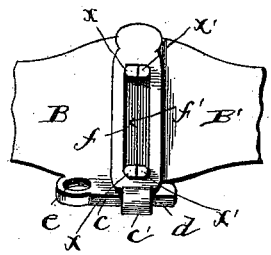
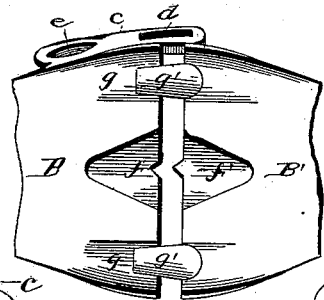
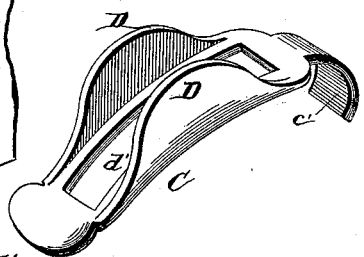
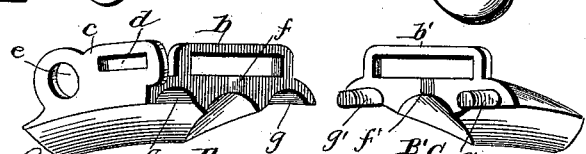
WITNESSES:
INVENTOR
P. T. Bradley.
BY
Higdon & Higdon
ATTORNEYS

UNITED STATES PATENT OFFICE.

PETER T. BRADLEY, OF KANSAS CITY, MISSOURI.

HORSE-COLLAR FASTENER.

SPECIFICATION forming part of Letters Patent No. 431,548, dated July 8, 1890.

Application filed April 28, 1890. Serial No. 349,812. (No model.)

*To all whom it may concern:*

Be it known that I, PETER T. BRADLEY, of Kansas City, Jackson county, Missouri, have invented certain new and useful Improvements in Horse-Collars, of which the following is a full, clear, and exact description, reference being had to the accompanying drawings, forming a part hereof.

My invention relates to an improvement in horse-collar fasteners; and it consists in the novel construction and combination of devices fully described hereinafter in connection with the drawings, and specifically pointed out in the claims.

My object is to provide a simple, cheap, and effective fastener for the free ends of the section of separable horse-collars or collars which are open at their lower ends and are hinged together at their upper ends.

Referring to the drawings, Figure 1 represents an inverted perspective view of a horse-collar with my fastener in position. Fig. 2 is a bottom plan view of the same. Fig. 3 is a side elevation of the fastener. Fig. 4 is a view of the upper and inner face of a section of the fastener as about to be applied to each other. Fig. 5 is a detached perspective view of the sections of the fastener in an inverted position. Fig. 6 is a detail perspective view of the locking-plate. Fig. 7 is an inverted plan view showing a modified form of connection between the sections of the fastener and the locking-plate.

A represents the collar, to which is attached the fastening device consisting of two sections or plates B and B' and the locking-plate C. The sections B and B' are fitted, respectively, on the lower meeting ends of the sections $a'$ and $a''$ of the collar A. The sections or socket-pieces B and B', which consist of the curved plate in contour, are adapted to fit snugly in the crease between a part of the neck-rolls and the collar, and are each provided on their meeting ends with the loops $b$ and $b'$.

The abutting flat surfaces or ends of the sections B and B' are provided, respectively, with semicircular notches $g\ g$ and the protuberances $g'\ g'$ to fit in said notches when the collar is locked, said protuberances or projections being tapered or frustum-shaped to assist in guiding them in the notches, and thereby insures the proper connection of the socket-pieces; and I also provide on their meeting faces the V-shaped notch $f$ and V-shaped projection $f'$ to assist in holding the sections from lateral play. These sections B and B' are also provided with the flattened fingers or projections $h$ and $h'$, which are curved toward their free ends to engage the hames and hold them on the collar.

It is obvious that the hames will rest in the concave outer surfaces of the sections B and B', and thereby hold them from movement. The sections are also provided with countersunk perforations, through which pass the screws or rivets which secure the sections to the collar A. The section B is also provided with the downward extension or flange $c$, which is provided with a circular opening $e$ and the slot $d$, to which is pivotally hinged by means of the extension $c$, which is looped, the locking-plate C.

The locking-plate C is provided with the slot $d'$, through which passes the loops $b$ and $b'$ of the sections B and B', and is also provided with the lateral flanges D, which are adapted to fit in the concave face of the sections B and B'.

The opening $e$ in the flange $c$ is adapted to receive the upper end of the martingale or breast-strap.

Fig. 7 is an inverted plan view showing perpendicular projections $x\ x'$ instead of loops $b$ and $b'$, over which the locking-plate C engages.

The hame-strap is guided between the projections $x$ and $x'$, which serve to hold it from any lateral movement.

Having thus described my invention, what I claim as new, and desire to secure by Letters Patent, is—

1. In a horse-collar fastener, the combination of the sections B and B', with the flat or abutting surfaces or ends provided with the tapered or frustum-shaped protuberances, and V-shaped projection engaging the recesses and notch, and the locking-plate C, substantially as described.

2. In a horse-collar fastener, the sections B and B', concavo-convex in cross-section, and the transverse loops which are engaged by the locking-plate C, which is provided with the semicircular flanges D, adapted to fit in the concave faces of the sections B and B', and the extension or strip c', by which it is hinged, substantially as described.

3. In a horse-collar fastener, a section having the flange extending downward, with the opening in the same to receive the end of the martingale or breast-strap, the slot d, and the locking-plate hinged thereto by means of the loop c, substantially as set forth and described.

In testimony whereof I affix my signature in presence of two witnesses.

PETER T. BRADLEY.

Witnesses:
H. E. PRICE,
A. A. HIGDON.